United States Patent [19]

Hinson et al.

[11] Patent Number: 4,663,859

[45] Date of Patent: May 12, 1987

[54] METHOD FOR IMPROVING STRENGTH OF DRY DYE PARTICLES AND REDUCING EXPLOSION HAZARDS

[75] Inventors: James W. Hinson, Jackson; Diane H. Roe, Mobile, both of Ala.

[73] Assignee: Ciba-Geigy Corporation, Ardsley, N.Y.

[21] Appl. No.: 784,129

[22] Filed: Oct. 4, 1985

[51] Int. Cl.[4] .................... F26B 3/08

[52] U.S. Cl. .................... 34/10; 34/12; 241/17

[58] Field of Search .................... 34/10, 12; 241/17

[56] References Cited

U.S. PATENT DOCUMENTS 3,748,745 7/1973 Sachs et al. .................... 34/10

3,879,855 4/1975 Weiser et al. .................... 34/10

4,327,998 5/1982 Sandefur et al. .................... 34/12

*Primary Examiner*—Larry I. Schwartz

*Attorney, Agent, or Firm*—Karl F. Jorda

[57] ABSTRACT

A process for preparing dry dye granules is disclosed. The process involves the preparation of a controlled moisture content slurry of the dye. Then introducing the slurry into a turbogranulator to form solid spherical particles whose size is controlled by the moisture content of the slurry. Then drying the particles in a fluidized bed dryer by heated air. Most of the fines are removed during the drying stage in the exit air stream from the dryer. The remaining fines and over sized particles are recovered on screening and are combined and ground and used to control the moisture content of the initial slurry. The final solid granules have good strength as compared to the previously marketed spray-dried materials which were in the form of porous hollow spheres. They are more readily dispersible and more rapidly dissolving.

5 Claims, No Drawings

METHOD FOR IMPROVING STRENGTH OF DRY DYE PARTICLES AND REDUCING EXPLOSION HAZARDS

FIELD OF THE INVENTION

This invention relates to dyes in uniform, pure, saleable form and more particularly to dyes in granular form, standardized to tinctorial strengths, having little or no dust explosive hazard and of sufficient particle strength to permit shipping on skids in kraft or plastic bags.

BACKGROUND OF THE INVENTION

Traditionally dyes have been shipped to users in the textile, paper and soap industries in the form of dyestuff slurries; as wet cake from the final filtration step; or if shipped dry, in fiber drums.

In the wet form i.e. as slurries or wet cake, the dyestuffs must be formulated for rapid dispersability and stability of the liquid or semisolid state during storage and shipping. Often the stabilizing agents added, adversely affect the substantivity of the dyes for their intended use. In addition should the slurries or wet cake dry out, the resultant powders are difficult to re-wet as the powdered dyes tend to float on the water and require special surfactants and treatment.

The surfactants used for re-wetting often interfere with the application of the dyestuffs to the final substrate as they may interfere with the charge on the dye molecules.

Attempts have been made to ship the dyes in dry form packed in fiber drums. If shipped in powder form as dried from the slurry or wet-cake, the dyes are usually extremely light and fine powders. Not only are such powders difficult to re-wet, as noted above, but the powders are all pervasive, coloring and contaminating the surroundings. Additionally, the extremely fine light powders, floating in the air as dusts (under 200 microns in diameter), can present explosion hazards.

The economic drawbacks of shipping slurries or wet cakes include the payment for shipping the large amounts of water, usually 25 to 60% water content. The fiber drums used for the dry powders have a weight drawback when the metal bottoms and closures are considered in the total container weight.

To overcome some of the above problems, the past practice, particularly in the fields of fluorescent whitening agents and basic dyes, which are shipped in tremendous quantities for textiles and soap use, has been to spray-dry the dyes.

Spray-drying of these dyes results in the formation of granules or spheres of the dye which remain after the water from the slurry is rapidly removed. By control of the dryer feed using spray nozzles with specific orifices, to define shape spray pattern and direction and particle size, or by use of a rotating disk atomizer, it has been possible to form granules or spheres which can be rapidly dried in the spray chamber, with minimum particle attrition. However, the resulting granules have little compression strength due to the requirement for rapid moisture removal and inherent lack of particle compression during spray granule formation. Attempts had been made to strengthen the inherent integrity of the granules by adding binders, such as gums or sodium silicate to the slurry before spraying, but such additives were often undesirable and did not afford sufficient strength.

Because of the lack of strength of the spray-dried dye spheres, it has been necessary to ship them in fiber drums. When stacked-bag, shipping was attempted it was found that the weight of stacked bags reduced the spheres in the bags at the bottom layer to unacceptable powder. As mentioned above, such powders are difficult to rewet, contaminate the surroundings with their pervasive color or fluorescence and can present an explosive hazard.

Economically the most important of such dyes are the fluorescent whitening agents (FWA).

These are used in textile manufacture where they are added to the polymers during fiber formation and during dyeing after spinning, weaving or knitting and during thermosetting resin treatments such as for wash and wear. Even more of these dyes are used by "soapers", the manufacturers of laundering detergents and aids. Particularly useful and used in tens of million of pounds annually as brighteners, are the triazinyl stilbene fluorescent whitening agents (FWA's), marketed under the Tinopal ® trademarks, by Ciba-Geigy.

It is an object of this invention to provide a method for producing dyes and particularly forms of FWA, which are in granular form, directly from filter cakes or slurries.

More particularly, it is an object of this invention to provide the dyes in granular form of sufficient strength to withstand the rigors of shipment in bags without the need for binders. In addition, as an ancillary object, the explosion hazard from powdered dyes should be reduced.

A further object is the provision of a method for preparing dye granules which are standardized for assay (tintorial, optical density, or fluorescence) during their preparation and which require no further standardization after drying.

It is also an important object that the dry granules from the process of this invention be readily dispersable and soluble in aqueous systems without the addition or recourse to wetting agents or dispersing agents.

THE INVENTION

The process of this invention comprises the steps of forming a pumpable standardized slurry of the dye; feeding the slurry into a high intensity turbine-type granulator; granulating the feed in said granulator between its turbine-casing and its rotor elements; discharging the wet granules into a fluidized-bed, particulate dryer; drying the granules by a stream of dry air blown through said bed of granules; said air stream on leaving the bed, entrains the fines of undersized granules which are then separated from the air stream; discharging the dried granules from said fluidized bed drier.

The process may include further steps where the granules discharged from the fluidized bed drier are sieved to remove the commercially unacceptable oversized particles. These oversized particles are ground and combined with the collected fines and introduced to the turbogranulator to adjust the proper moisture content of the mix within the turbogranulator. It has been noted that higher moisture content in the turbogranulator mix yields larger granules; and lower moisture content leads to smaller granules. Thus the size of the dried granules is primarily controlled by the control of the moisture content of the mix within the granulator. To a lesser degree the size is affected by the speed of the rotor.

The starting slurry for the process of this invention can be obtained directly from the dye manufacturing process or from slurrying of the wet filter-cake which is the form that the dye is stored between manufacture and granulation. The direct or reslurried dyes, are adjusted to tinctorial strength, optical density and/or fluorescence, and to proper moisture content by the addition of inert diluents and/or by reslurrying of the fines and ground oversize products. The amount of off sized material is introduced and equilibrated to modify the moisture content based upon the particle size distribution of the final granules.

DETAILED DESCRIPTION OF THE INVENTION

The granulators useful for the practice of this invention, are commercially available. They are horizontal feed turbo-mixers consisting of a cylindrical casing surrounding a turbine rotor having affixed thereto a series of propeller elements in the form of paddles, blades or cylindrical pins. The stator blade elements, usually associated with turbomixers, are preferably absent as they interfere with proper granulation and lead to very small granules. The turbulent flow generated between the casing as stator and the rotor elements is sufficient to cause agglomeration of the solids in the slurry. The vortices formed, cause a laminer accretion of the solids leading to granules of high strength. This is in contrast to spray-dried granules. The rotor elements are adjusted so that the initial portion of the turbine has high energy turbulence to form the initial physical agglomerates. In the succeeding portions of the turbogranulator, the rotor elements impart less energy to the contents so that laminar accretion can take place therein leading to growth of the granules by compaction of high strength layers. Turbo-mixers modified in the above described manner are commercially available or readily modified from commercial mixers by removal of stators. The shape and distribution of the rotor elements are easily modified to provide the results described above. The clearance between the rotor elements and the casing, similarly is not critical provided that it does not lead to accretion of solids on the casing or abrasion of the rotor elements on any particle adherent to the casing.

The moist granules are discharged directly onto a fluidized bed dryer. Either a static-bed or vibratory-bed dryer may be used. In the static-bed dryers the granules are dried by heated air and pneumatically transported through the unit. The vibratory-bed fluid bed apparatus also dries the product with heated air but moves the material through the unit by the vibratory action of the bed. While both units function well in the practice of the invention, it was found that the vibratory bed unit needs less air, thus it uses less heated air, thus requiring a less extensive air-heating and air-handling system. The amount of fines generated and recovered in both systems were essentially similar. Satisfactory static and vibratory fluidized bed drying systems are commercially available.

The fines, i.e. dye granules and powder of particle size under 150 microns (−100 mesh) entrained in the exhaust drying air are primarily separated from the heated air in cyclones and ultimately in bag collectors. The fines from the bags and cyclones are fed to the turbogranulator to adjust the moisture content of the granulator mix.

The granular material from the dryer is fed unto a screen sieve.

All material passing through the 30 mesh screen but retained on the 100 mesh screen (150-600 microns) is transported by screw feed or particle elevators to the packaging areas.

Particles over 30 mesh and those under 100 mesh are combined and are fed to a grinder. This ground material is then recycled to the turbogranulator for use in adjusting the moisture content of the granulator mix.

Occasionally, some of the acceptable-sized product, i.e. −30−100 mesh, may be diverted to the "oversize" mill to provide sufficient powder for feeding to the turbogranulator.

An ancillary benefit from this invention flows from the increased size and density of the resulting granules. The granules have a lower explosion hazard than either the finely subdivided powder or the spray dried pellets or spheres of the prior art. Some dried powdered dyes, of course, being finely divided organic materials are extremely pyrophoric. The spray-dried materials, although not in the same hazard class, are also to be handled with caution because of their large specific surface areas.

Experimental work has shown that 40 pound polyethylene bags filled with granules as described in the examples, may be loaded on skids, ten bags high without any visible crushing of the granules in the lowest tier of bags.

In addition, the granules readily and completely dissolved in water at rates comparable to those of the spray dried granules and wetted faster than the spray dryed dyes.

EXAMPLE 1

Laboratory Scale

A turbine-type granulator was prepared from a 16" length of 5" ID PVC pipe capped at each end with stainless steel end plates, one fitted with a thrust bearing for accepting the one end of the rotor shaft and the other fitted with a ball bearing for the long end of the rotor shaft connected to a variable speed motor. The rotor was fitted with ten circular mixing elements at half inch intervals. The rotor elements each consisting of six pins radially fixed with respect to the rotor shaft. The PVC pipe stator was fitted with a removable cover for the introduction of the slurry and for the discharge of the granules.

Tests were conducted on three types of triazinyl stilbene F.W. Agents; Tinopal® 5BM, Tinopal® AMS, and Tinopal® UNPA and on Maxilon Blue GRL a cationic blue dye. Initially, 5BM dry powder was charged into the apparatus and wetted with water and/or sodium silicate solution. Salt for crystallization and optical density adjustment and Daxad 17, a dispersing agent were also added. Granulation was successfully achieved. Then it was determined in another series that wet filter cake mixed with the dye powder could be granulated with greater ease, thus eliminating the need for all dry powder to feed to the granulator. Powder was added to the granulator with the wet cake only in amounts sufficient to obtain the moisture content required for granulation. It was found that the size of the granules is directly related to the moisture content of the mixture in the granulator; low moisture, within the limits needed for granulation results in small granules and high moisture results in large granules. In this laboratory apparatus it was found that a moisture content of 30% for 5BM and 35% for AMS proved satisfactory. (In commercial scale apparatus- In Bepex Turbulizers and in Ferro-Tech Turbulators the moisture content of 26% was determined to be appropriate for both products.) The desired granule sizes could be maximized in practice by moisture content variations of about two percent on each side of the approptiate moisture ranges for each type of apparatus. Tests in this apparatus showed that granule size was independent of variations in rotor speed as well as salt and disperser content.

The granules from the turbine granulator were dried in lab sized fluidized bed driers to determine the size distribution of the granules. Upon completion of these tests it was determined that this process was feasible.

EXAMPLE 2

Commercial scale granulation of Tinopal ® -5BM in Bepex Turbulizers

A series of nineteen test runs were conducted in a Bepex Turbulizer capable of granulating about 1,600 pounds per hour of slurry. In optimum form derived from the test runs the slurry consisted of 1042 pounds of wet cake and 600 pounds of recycled dry fines. The wet cake consisted of triazinyl silbene of average 51.8% moisture and a bulk density of about 35.3 pounds per cubic foot. The dry fines had a size of under 150 microns, a 1% moisture content and a loose bulk density of 19.5 pounds per cubic foot. In the 19 runs variables such as rotor speed, effects of water injection in producing a homogenous granulated material and its effects on the apparatus; variations in the internal arrangement of the agitator paddles on the rotor; excess water in the slurry followed by slower throughput and prolonged drying, and maximizing the percent yield of the final acceptable size dried product i.e. between 30 to 100 mesh and having about 2.5% moisture. The optimized yield between 30 and 100 mesh was about 70%. The drying in all the above cases was in a static fluidized bed, with pneumatic advance through the bed.

EXAMPLE 3

Commercial scale granulation of Tinopal ® 5BM F.W.A. in the Ferro-Tech Turbulator This equipment is similar to the previous (Bepex) equipment. The major differences is the utilization of pins on the rotor instead of the adjustable paddles in the Bepex apparatus. As a result, the power requirements are lower. The equipment for comparable hourly output requires about 40 horsepower as compared to 100 horsepower for the equipment of Example 2. The size of the equipment for this example is slightly larger. The quality of the product were comparable. The material exiting from the Turbulator was dried to about 2.5% moisture content on vibratory-feed fluidized-bed apparatus manufactured by both Carmen Industry Inc, and Carrier Vibrating Dryers marketed by Rexnord of Louisville, Kentucky.

EXAMPLE 4

Products from the final run of Example 2 and the continuous operation of Example 3 were tested and the physical standard determined as compared to the spray dried material. Thermal stability and flammability and explosive hazards were determined for the granules from this invention prepared as set forth in Examples 2 and 3. These results are tabulated below:

PHYSICAL PROPERTIES COMPARISON SPRAY-DRY VERSUS GRANULATION

| | Tinopal 5BM | | Tinopal AMS | | Tinopal UNPA | |
|---|---|---|---|---|---|---|
| | Spray-Dry | Granule | Spray-Dry | Granule | Spray-Dry | Granule |
| Angle of Repose | 37° | 25° | 36° | 26° | 40° | 33° |
| Angle of Slide | 36–45° | 20–28° | 35–38° | 25–31° | 31–41° | 30–34° |
| Bulk Density (lbs/ft) | | | | | | |
| Loose | 20.1 | 32.9 | 15.5 | 28.5 | 23.2 | 24.0 |
| Packed | 31.1 | 35.7 | 22.7 | 33.6 | 30.5 | 26.3 |
| % Compressibility | 54.7 | 8.5 | 46.5 | 17.9 | 31.5% | 9.6 |
| Particle Shape | Hollow Sphere | Solid Spherical Agglomerates | Hollow Sphere | Solid Spherical Agglomerates | Hollow Sphere | Solid Spherical Agglomerates |
| Particle Size (microns) | <75 | 150–600 | <75 | 150–600 | <300 | 150–600 |

*Tinopal 5BM = Benzenesulfonic acid, 2,2'-(1,2-ethenediyl)bis[5-[[4-[(2-hydroxyethyl)methylamino]-6-(phenylamino)-1,3,5-triazin-2-yl]amino]-,disodium salt $C_{38}H_{40}N_{12}O_8S_2.2Na$ Tinopal AMS = Benzenesulfonic acid, 2,2'-(1,2-ethenediyl)bis[5-[[4-(4-morpholinyl)-6-(phenylamino)-1,3,5-triazin-2-yl]amino]-disodium salt $C_{40}H_{40}N_{12}O_8S_2.2Na$ Tinopal ® UNPA = Benzenesulfonic acid, 2,2'-ethendiyl)bis[5-[[4-[bis(2-hydroxyethyl)amino]-6-(phenylamino)-1,3,5-triazin-2-yl]amino]-$C_{40}H_{44}N_{12}O_{10}S_2$ The process was fully described in the appended examples. However, the invention is not limited to described modes, the equipment used. All art recognized equivalent materials, and equipment performing the described functions in the indicated manner are intended to be within the ambit of the invention.

What is claimed is:

1. A process for the production of uniform, high strength granules of dyes which comprises the steps of forming a pumpable standardized slurry of the dye; feeding the slurry into a high-intensity turbine-type granulator; granulating said feed in the granulator between its turbine casing and its rotor elements; discharging the formed wet granules unto a fluidized-bed particulate dryer; drying said wet granules by a stream of dry heated air blown through the bed of granules in said dryer; said air stream, on leaving the bed entraining the fines of undersized granules which are then separated from said air stream; and discharging the remaining dry granules from said fluidized bed dryer.

2. The process according to claim 1 wherein the dried granules discharged from the fluidized bed are sieved to separate any oversized granules.

3. The process according to claim 1 wherein the dry fines separated from the air stream and/or the dried oversized granules, from claim 2, ground to powder, are combined and fed to the turbogranulator to standardize the moisture content granulator mix.

4. The process according to claim 3 wherein the granulator mix is standardized to higher moisture content when the granules are undersized and the granulator mix is standardized to a lower moisture content when the granule particle size is to be reduced.

5. Granules of dyestuffs prepared according to the process of claim 1.

* * * * *